United States Patent Office 3,335,186
Patented Aug. 8, 1967

3,335,186
PRODUCTION OF AMINO ALCOHOLS
George P. Speranza, Austin, Tex., assignor to Jefferson Chemical Company, Inc., Houston, Tex., a corporation of Delaware
No Drawing. Filed Oct. 21, 1963, Ser. No. 317,788
4 Claims. (Cl. 260—584)

This invention is directed to amino alcohols. More particularly, this invention is directed to the provision of N-hydroxyalkylaminoethoxyethanols.

Amino polyalkanols such as mono-, di- or tri-ethanolamine or mono-, di- or isopropanolamine have found utility as emulsifying agents for such diverse products as hand lotions, cosmetic creams, shampoos, polishes, as solubilizing agents for organic compounds such as 2,4-dichlorophenoxyacetic acid, as additives for lowering the pour point of lubricating oils, in the form of fatty acid reaction products, as soaps, etc. However, amino polyalkanols of this nature tend to be solids or viscous liquids at ambient temperatures and are therefore difficult to work with.

It has now been discovered in accordance with one form of the present invention that these and related problems can be overcome with the provision of N-hydroxyalkylaminoethoxyethanols of the general formula:

$$\begin{array}{c} R\ R \\ HO-C-C-N-CH_2CH_2OCH_2CH_2OH \\ R\ R\ H \end{array}$$

wherein R is selected from the group consisting of hydrogen, alkyl, cycloalkyl, alkoxyalkyl and monoaryl groups containing 1 to 18 carbon atoms.

Conventional methods for preparing products of this nature are cumbersome and time consuming. For example, in Carnes U.S. Patent No. 2,629,740, the production of N-hydroxypropyloxypropylethanolamine is disclosed by a synthesis involving the reaction of isopropanolamine with a carbonyl compound in an organic soluble solution to provide an oxazolidine which is reacted with propylene oxide to form the intermediate product. The intermediate is recovered from the organic solvent and is then hydrolyzed to generate the carbonyl compound and provide the desired N-hydroxypropyloxypropylethanolamine, which must be recovered from the hydrolyzed product by extraction.

In contrast, in accordance with the present invention, a simple, one-step synthesis is provided for the production not only of compounds of the formula given above, but also of compounds of the formula:

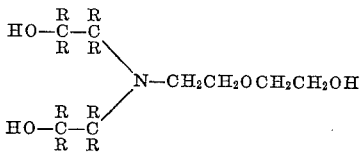

wherein R has the meaning given above.

Briefly, this is accomplished in accordance with the present invention by reacting aminoethoxyethanol with an epoxide having the formula:

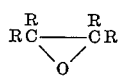

wherein R has the meaning given above, in the absence of a catalyst at a temperature within the range of from about 50° to about 125° C. at about atmospheric pressure in the molar ratio of about 0.1 to 2 mols of epoxide per mol of aminoethoxyethanol. As a consequence of the simple, one-step addition, the hydroxyalkylaminoethoxyethanols of the present invention are provided directly.

In general, when it is desired to provide a trifunctional reaction product, about two mols of epoxide per mol of aminoethoxyethanol are employed and an excess of epoxide may be utilized, if desired, since the reaction has been found to be specific with respect to the reaction of the epoxide with the amino hydrogens of the aminoethoxyethanol.

When it is desired to provide diols of the present invention, it is normally preferable to utilize from about 0.2 to about 1 mol of epoxide per mol of aminoethoxyethanol. At the lower ratios the reaction product will predominantly comprise unreacted N-(hydroxyalkyl) ethanolamine. With higher epoxide mol concentrations approaching one, the reaction product will contain lesser quantities of N-(hydroxyalkyl) ethanolamine and will contain larger quantities of N-(hydroxyethoxyethyl) dialkanolamines and minor amounts of unreacted aminoethoxyethanol.

The starting materials for the present invention are aminoethoxyethanol and an epoxide of the formula:

wherein R has the meaning given above.

Representative examples of compounds that may be utilized alone or in admixture in accordance with the present invention include ethylene oxide,
propylene oxide,
isobutylene oxide,
1,2-epoxybutane,
2,3-epoxybutane,
2,3-dimethyl-2,3-epoxybutane,
2-methyl-2,3-epoxypentane,
1,2-epoxyheptane,
5-methyl-1,2-epoxyhexane,
3,4-epoxyheptane,
styrene epoxide,
1-cyclohexylepoxyethane,
2-methyl-1,2-epoxyheptane,
1,2-epoxyoctane,
2,4,4-trimethyl-1,2-epoxypentane,
2,4,4-trimethyl-2,3-epoxypentane,
1-phenyl-1,2-epoxypropane,
2-phenyl-1,2-epoxypropane,
1,2-epoxynonane,
1-phenyl-2-methyl-1,2-epoxypropane,
1-phenyl-1,2-epoxybutane,
4-phenyl-1,2-epoxybutane,
5-phenyl-1,2-epoxypentane,
1,2-epoxydecane,
1-(p-tolyl)-2-methyl-3-phenyl-2,3-epoxybutane,
1-phenyl-2-ethyl-1,2-epoxybutane,
1-phenyl-2-methyl-1,2-epoxypentane,
1,2-epoxydodecane,
3-ethoxy-4-propyl-3,4-epoxyheptane,
1,1-diphenyl-1,2-epoxypropane,
1,2-diphenyl-1,2-epoxypropane,
1,3-diphenyl-1,2-epoxypropane,
1-phenyl-2-(p-tolyl)-epoxyethane,
1-phenyl-1-(m-methoxyphenyl)-epoxyethane,
1-phenyl-1-(o-methoxyphenyl)-epoxyethane,
1'1-diphenyl-2-methyl-1,2-epoxypropane,
2,3-diphenyl-2,3-epoxybutane,
1,1-diphenyl-1,2-epoxybutane,
1,1-di(p-tolyl)-epoxyethane,
1,3-diphenyl-2-methyl-1,2-epoxypropane,
1-phenyl-2-benzole-1,2-epoxypentane,
1-phenyl-2-benzole-3-methyl-1,2-epoxybutane,
1,2-epoxyoctadecane,
9,10-epoxyoctadecane,
epichlorohydrin, etc.

In conducting the process of the present invention, aminoethoxyethanol is added to an appropriate reaction vessel, such as an autoclave, alone or in admixture with about 10 to 50 wt. percent of water and reacted in an inert atmosphere with the epoxide at about atmospheric pressure at a temperature within the range of from about 20° to about 200° C., and more preferably, from about 50° to about 125° C. The reaction time is appropriately within the range of about 0.5 to about 3 hours with the epoxide being continuously or intermittently added during the course of the reaction period.

As indicated, the reaction is conducted in the absence of an oxyalkylation catalyst.

The invention will be further illustrated with respect to the following specific examples, which are given by way of illustration and not as limitations on the scope of this invention:

EXAMPLE I

*N-(hydroxyethoxyethyl) diisopropanolamine*

To a one-liter, three-necked flask equipped with a stirrer, thermometer, dropping funnel and Dry Ice condenser was added 315 g. of aminoethoxyethanol and 60 g. of water. The flask was immersed in an ice bath and 360 g. of propylene oxide added over a period of about one hour. The temperature rose to about 60° C. and was kept at this temperature for one hour after all of the propylene oxide was added. The water was removed at 5 mm. pressure. The pot temperature reached 144° C. The colorless liquid product weighed 658 g. It had an equivalent weight of 222 by amine titration (theory 221).

EXAMPLE II

*N-(hydroxyethoxyethyl) ethanolamine and N-(hydroxyethoxyethyl) diethanolamine*

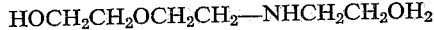

and

To a one-gallon, shaker-type autoclave was added 1580 g. of aminoethoxyethanol and 100 g. of distilled water. The contents were flushed twice with nitrogen, heated to 40° C. and 440 g. of ethylene oxide added at a temperature of 40° to 50° C. as it reacted. The product was distilled through 2″ x 36″ of SS packing. There was obtained 745.5 g. of unreacted aminoethoxyethanol; 699 g. of N-hydroxyethyldiglycolamine (equivalent weight 149; theory 149) and 472 g. of N-hydroxyethoxyethyl-diethanolamine (equivalent weight 194; theory 194).

Having thus described my invention, what is claimed is:

1. A method which comprises the steps of non-catalytically reacting an aminoethoxyethanol at a temperature within the range of from about 20° to about 200° C. with an epoxide of the formula:

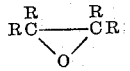

wherein R is selected from the group consisting of hydrogen and alkyl, cycloalkyl, alkoxyalkyl, chloroalkyl and monoaryl groups containing 1 to 18 carbon atoms, whereby there is provided a hydroxy ethylene amine derivative of the said aminoethoxyethanol containing at least one hydroxy ethylene group corresponding to said epoxide.

2. A method for producing a compound of the formula:

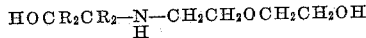

wherein R is selected from the group consisting of hydrogen and alkyl, cycloalkyl, alkoxyalkyl, chloroalkyl and monoaryl groups containing 1 to 18 carbon atoms which comprises the steps of non-catalytically reacting aminoethoxyethanol at a temperature within the range of about 50° to about 125° C. with from about 0.1 to about 1 mol per mol of aminoethoxyethanol of an epoxide having the formula:

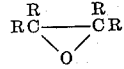

wherein R has the meaning given above, and recovering said compound from the reaction product.

3. A method as in claim 2 wherein the epoxide is propylene oxide.

4. A method as in claim 2 wherein the epoxide is ethylene oxide.

References Cited

UNITED STATES PATENTS

| | | | |
|---|---|---|---|
| 2,293,494 | 8/1942 | De Groote et al. | 260—584 |
| 2,622,099 | 12/1952 | Ferrero et al. | 260—584 |

OTHER REFERENCES

Kretov et al., Chemical Abstracts, vol. 55 (October 1961) page 19851a.

CHARLES B. PARKER, *Primary Examiner.*

RICHARD L. RAYMOND, *Assistant Examiner.*